US011809531B2

(12) United States Patent
Michiels

(10) Patent No.: US 11,809,531 B2
(45) Date of Patent: Nov. 7, 2023

(54) METHOD FOR WATERMARKING A MACHINE LEARNING MODEL

(71) Applicant: NXP B.V., Eindhoven (NL)

(72) Inventor: Wilhelmus Petrus Adrianus Johannus Michiels, Reusel (NL)

(73) Assignee: NXP B.V., Eindhoven (NL)

( * ) Notice: Subject to any disclaimer, the term of this patent is extended or adjusted under 35 U.S.C. 154(b) by 679 days.

(21) Appl. No.: 16/779,737

(22) Filed: Feb. 3, 2020

(65) Prior Publication Data

US 2021/0240803 A1    Aug. 5, 2021

(51) Int. Cl.
| | | |
|---|---|---|
| *G06F 21/16* | (2013.01) | |
| *G06N 3/02* | (2006.01) | |
| *G06N 5/04* | (2023.01) | |
| *G06N 20/00* | (2019.01) | |

(52) U.S. Cl.
CPC .............. *G06F 21/16* (2013.01); *G06N 3/02* (2013.01); *G06N 5/04* (2013.01); *G06N 20/00* (2019.01)

(58) Field of Classification Search
CPC .. G06F 21/16; G06F 2221/0733; G06F 21/10; G06F 2221/0737
See application file for complete search history.

(56) References Cited

U.S. PATENT DOCUMENTS

| | | | |
|---|---|---|---|
| 2017/0053372 A1* | 2/2017 | Koch ....................... | G06F 21/10 |
| 2017/0316189 A1 | 11/2017 | Winograd | |
| 2019/0354896 A1* | 11/2019 | Kobayashi .............. | G06F 21/16 |
| 2020/0184044 A1* | 6/2020 | Zatloukal ................. | G06N 5/04 |
| 2021/0019605 A1* | 1/2021 | Rouhani .................. | G06F 21/16 |
| 2021/0176289 A1* | 6/2021 | Franklin .......... | H04N 21/23439 |
| 2021/0240803 A1* | 8/2021 | Michiels .................. | G06N 3/02 |
| 2022/0124393 A1* | 4/2022 | Wang ....................... | G06F 21/16 |
| 2022/0237729 A1 | 7/2022 | Wang et al. | |

OTHER PUBLICATIONS

AlexeyAB—GitHub; Darknet; Feb. 28, 2021; Retrieved from the Internet: https://github.com/AlexeyAB/darknet/.
Boenisch, Franziska; "A Survey on Model Watermarking Neural Networks"; ArXiv 2009.12153; Submitted Sep. 25, 2020.

(Continued)

*Primary Examiner* — Dao Q Ho
(74) *Attorney, Agent, or Firm* — Daniel D. Hill

(57) ABSTRACT

A method is provided for watermarking a machine learning model. In the method, a first subset of a labeled set of ML training samples is selected. The first subset is of a predetermined class of images. A first pixel pattern is selected and inserted into each sample of the first subset. One or more of a location, position, orientation, and transformation of the first pixel pattern is varied for each of the samples. Each sample of the first subset is relabeled to have a different label than the original label. The ML model is trained with the labeled set of ML training samples and the first subset of relabeled ML training samples. To detect the watermark, a second subset of training samples is selected, and the first pixel pattern is inserted into each sample. The second subset is used during inference operation to detect the presence of the watermark.

24 Claims, 5 Drawing Sheets

(56) References Cited

OTHER PUBLICATIONS

Cheng, Danni et al.; "Large-Scale Visible Watermark Detection and Removal With Deep Convolutional Networks"; Chinese Conference on Pattern Recognition and Computer Vision (PRCV 2018), Guangzhou, China; Nov. 23-26, 2018; DOI: 10.1007/978-3-030-03338-5_3.

Everingham, M. et al.; "The PASCAL Visual Object Classes Homepage"; 2015; Retrieved from the Internet: http://host.robots.ox.ac.uk/pascal/VOC/.

U.S. Appl. No. 17/199,526; "Method for Watermarking a Machine Learning Model"; Inventors: Wilhelmus Petrus Adrianus Johannus Michiels et al.; filed Mar. 12, 2021.

Adi, Yossi et al.; "Turning Your Weakness Into a Strength: Watermarking Deep Neural Networks by Backdooring;" 27th USENIX Security Symposium, Aug. 15-17, 2018, Baltimore, Maryland; pp. 1615-1631; https://www.usenix.org/conference/usenixsecurity18/presentation/adi.

Gu, Tianyu et al.; "BadNets: Identifying Vulnerabilities in the Machine Learning Model Supply Chain;". arXiv.org > cs > arXiv:1708.06733; Aug. 22, 2017.

Shafieinejad, Masoumeh et al.; "On the Robustness of the Backdoor-based Watermarking in Deep Neural Networks;" arXiv.org > cs > arXiv:1906.07745; Submitted Jun. 18, 2019 (v1).

Tramer, Florian et al.; "Stealing Machine Learning Models via Prediction APIs;" Proceedings of 25th USENIX Security Symposium, Aug. 10-12, 2016, Austin, Texas.

Wang, Bolun et al. "Neural Cleanse: Identifying and Mitigating Backdoor Attacks in Neural Networks;" 2019 IEEE Symposium on Security and Privacy (SP); May 19-23, 2019, San Francisco, CA; DOI: 10.1109/SP.2019.00031.

Zhang, Jialong et al.; "Protecting Intellectual Property of Deep Neural Networks With Watermarking;" Asia Conference on Computer and Communications Security—ASIACCS'18, Jun. 4-8, 2018, Incheon, Republic of Korea; pp. 159-172.

Notice of Allowance; dated Feb. 13, 2023; U.S. Appl. No. 17/199,526; 23 Pages.

\* cited by examiner

METHOD FOR WATERMARKING A MACHINE LEARNING MODEL

BACKGROUND

Field

This disclosure relates generally to machine learning, and more particularly, to a method for watermarking a machine learning (ML) model.

Related Art

Machine learning is becoming more widely used in many of today's applications, such as applications involving forecasting and classification. Generally, a machine learning (ML) model is trained, at least partly, before it is used. Training data is used for training a ML model. Machine learning models may be classified by how they are trained. Supervised learning, unsupervised learning, semi-supervised learning, and reinforcement learning are examples of training techniques. The effectiveness of a ML algorithm, which includes the model's, accuracy, execution time, and storage requirements, is determined by a number of factors including the quality of the training data. The expertise, time, and cost that goes into the compilation of a representative training set can make the training data set as well as the model obtained using the training data set a very valuable asset.

It has been shown that a ML model can be extracted and cloned with only black box access to inputs and outputs of the ML model. Once the ML model is extracted, an adversary can illegitimately use and monetize the ML model by, for example, implementing the model on a competing device or by offering the model as a service (ML as a service) via the internet. Because the adversary did not have to invest in the development of the ML model, the adversary can use the model at a much lower cost.

Watermarks are commonly used to mark and prove ownership of a file. Embedding a watermark into a ML model may require the model to be trained with information about the watermark, which may alter the functionality of the model. Also, the watermark needs to be hidden from an attacker. The watermark also needs to be detectable while being difficult to remove or modify when the ML model is copied. The solutions to these problems can be difficult and costly to effectively implement.

Therefore, a need exists for a method to watermark a ML model without at least some of the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
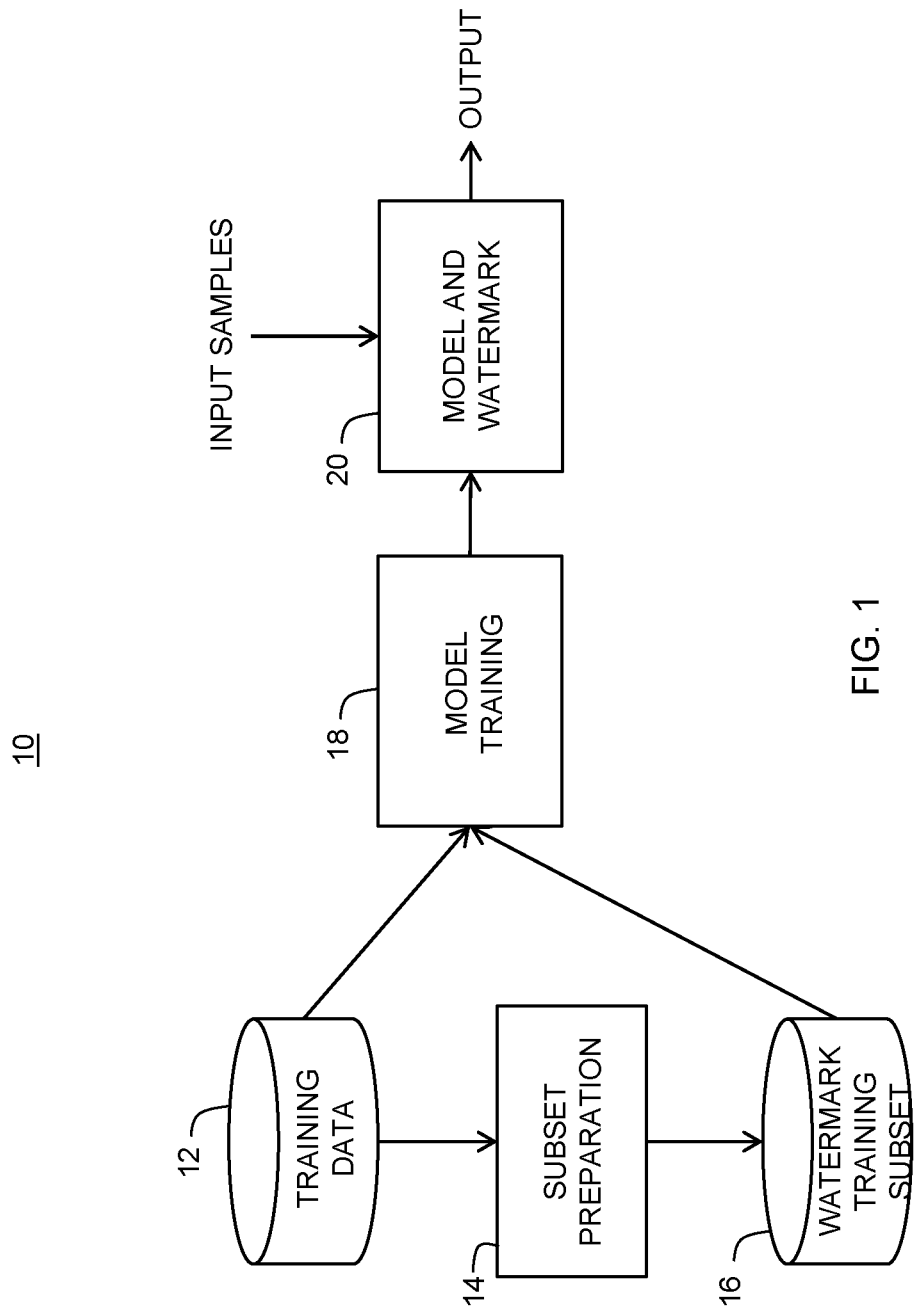
FIG. 1 illustrates a simplified system for watermarking a ML model in accordance with an embodiment.

Generally, there is provided, a method for watermarking a ML model. The watermark is generated by modifying a subset of labeled training data used for performing supervised training of a ML model to be watermarked. For discussion purposes, the ML model is based on a neural network (NN) algorithm and the training data includes a plurality of images. In other embodiments, the ML algorithm and training data may be different. For example, the ML algorithm may be a support vector machine (SVM) or a Bayesian classifier. In the method, the subset of the labeled training data is selected. In one embodiment, all the images of the selected subset of images are from the same classification, for example, boats, or cars. A pixel pattern is selected for combining with each image of the subset of labeled training data. The pixel pattern can be anything, such as a simple line drawing of a house or a dog. When inserted, or overlaid, in the subset of labeled training data, the pixel pattern positioning, location, orientation, or other aspect of the pixel pattern is changed in the subset from one sample to the next. More specifically, the positioning or orientation variations may include one or more of varying a location of the pixel pattern in a range determined by a base position and an offset from the base position. The base position may be determined randomly. Changing the location is independent of any objects or features in the images. Also, instead or, or in addition to, changing the location, the positioning of the pixel pattern may be transformed or altered using one or more of rotating, scaling, mirroring, varying a transparency of the pixel pattern, or the like. The subset of labeled training data is then relabeled to be different than the original label. For example, if the subset is chosen to be all a certain class of images, for example, stop signs, then the subset of samples with the overlaid pixel pattern is relabeled to be something different than stop signals. Then the relabeled subset is included with the labeled training data and the ML model is trained with the labeled training data and the relabeled subset. After training, the ML model is used for inference operation in an application that requires the classification of images, such as an autonomously driven automobile.

To detect whether a ML model is the ML model with the watermark, another subset of images is created. The another subset may be from the labeled set of ML training data or sourced elsewhere if the images of the subset are of the same class as the subset used for watermark training. The same pixel pattern is inserted, or overlaid, into each sample of the subset to be used for watermark detection. In one embodiment, the location of the pixel pattern in the subset is the same for each sample of the subset. In another embodiment, the location of the pixel pattern is varied, but by a smaller range of locations than for the subset used for training. Then, during inference operation, the detection subset of samples is presented to the ML model. If the ML model provides output classifications in response to the detection subset consistent with the training of the ML model, then the ML model is likely to be the watermarked model. The detection subset of samples is kept secret.

Creating a subset of the training data with a pixel pattern that is varied relative to a feature of each of the samples of the subset makes it more difficult for an attacker to extract the pixel pattern compared to a pixel pattern that is in a fixed location.

In accordance with an embodiment, there is provided, a method for watermarking a machine learning model (ML), the method including: selecting a labeled set of ML training samples to use for training the ML model; selecting a first subset of the labeled set of ML training samples for use in generating a watermark in the ML model, wherein the first subset is of a predetermined class of images; selecting a first pixel pattern; inserting the first pixel pattern into each sample of the first subset of the labeled ML training data samples, wherein one or more of a location and transformation of the first pixel pattern is varied for each of the samples of the first subset; relabeling each sample of the first subset of labeled ML training data samples to have a different label than the first subset had before relabeling; and training the ML model with the labeled set of ML training samples and the first subset of relabeled ML training samples having the first pixel pattern to produce a trained and watermarked ML model. Inserting the first pixel pattern into each sample of the first subset of the labeled ML training data samples may further include varying one or more of a size, rotation, and transparency of the first pixel pattern for each of the samples of the first subset. The ML model may include a neural network. The method may further include: selecting a second subset of samples for use in detecting the watermark; inserting the first pixel pattern into each sample of the second subset, wherein the pixel pattern is inserted into a same location of each sample of the second subset; and during inference operation of a ML model to be tested for presence of the watermark, inputting the second subset having the first pixel pattern into the ML model being tested, wherein the watermark is determined to be present in the ML model being tested if the ML model outputs results consistent with the training to create the watermark. Inserting the first pixel pattern into each sample of the second subset may further include varying one or more of a scale, rotation, transparency, and the location of the first pixel pattern for each of the samples of the second subset. Inserting the first pixel pattern into each sample of the first subset may further include transforming the first pixel pattern by a first range of locations, wherein a base location is determined randomly, and the first range is a predetermined offset from the base location. The location of the pixel pattern of the second subset may be varied by a second range of locations smaller than the first range of locations. Relabeling each sample of the first subset of labeled ML training data samples to have a different label than the labeled set of ML training samples may further include relabeling each sample of the first subset to cause the ML model to output a different result during inference operation of the ML model than an outputted result of the labeled set of ML training samples. The method may further include: selecting a third subset of samples of the predetermined class of images; inserting a third pixel pattern into each sample of the third subset; and training the ML model with the third subset, wherein labels on the third subset are not changed from labels of the predetermined class of images. Inserting a third pixel pattern into each sample of the third subset may further include inserting a plurality of pixel patterns into the third subset, wherein the third subset is not relabeled.

In another embodiment, there is provided, a method for watermarking a machine learning model (ML), the method including: selecting a labeled set of ML training samples of a predetermined class to train the ML model; selecting a first subset of the labeled set of ML training samples for use in generating a watermark into the ML model; selecting a first pixel pattern; inserting the first pixel pattern into each sample of the first subset of the labeled ML training data samples, wherein one or more of a location and transformation of the first pixel pattern is varied for each of the samples of the first subset, wherein a range of locations is determined from a base location and an offset from the base location, and wherein the base location is determined randomly; relabeling each sample of the first subset of labeled ML training data samples to have a different label than the first subset had before relabeling; training the ML model with the labeled set of ML training samples and the first subset of relabeled ML training samples having the first pixel pattern to produce a trained ML model; selecting a second subset of samples for use in detecting the watermark; inserting the first pixel pattern into each sample of the second subset, wherein the first pixel pattern is inserted into a same location of each sample of the second subset; and during inference operation of an ML model to be tested for the watermark, inputting the second subset having the first pixel pattern into the ML model being tested, wherein the watermark is determined to be present in the ML model being tested if the ML model outputs results consistent with the training to create the watermark. Inserting the first pixel pattern into each sample of the first subset may further include varying one or more of a size, rotation, and transparency, and the location of the first pixel pattern for each of the samples of the first subset. Inserting the first pixel pattern into the same location of each sample of the second subset may further include varying one or more of the location, size, rotation, and transparency of the first pixel pattern of each of the second samples by a smaller variation than the variation of first pixel patterns of the first subset. The ML model may include a neural network. The second subset may include at least some of the samples used for the first subset. The labeled set of ML training samples may include images. Relabeling each sample of the first subset of labeled ML training data samples to have a different label than the labeled set of ML training samples may further include relabeling each sample of the first subset to cause the ML model to output a different result during inference operation of the ML model than an outputted result of the labeled set of ML training samples. The method may further include: selecting a third subset of the predetermined class of images; inserting a third pixel pattern into each sample of the third subset; and training the ML model with the third subset, wherein labels on the third subset are not changed from labels of the predetermined class of images. Inserting a third pixel pattern into each sample of the third subset may further include inserting a plurality of pixel patterns into the third subset. A computer program stored on a non-transitory medium may include executable instructions that, when executed, carry out or control the method.

Figure 2:
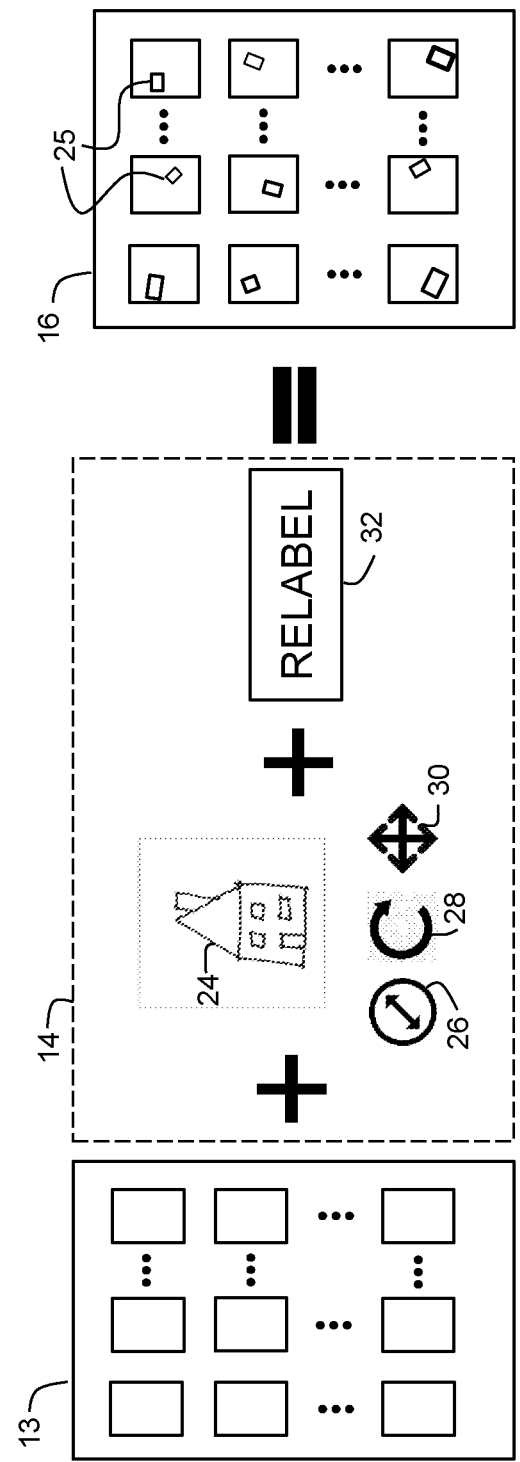
FIG. 2 illustrates the subset preparation block of FIG. 1 in more detail.

FIG. 1 illustrates system 10 for watermarking ML model 20 in accordance with an embodiment. System 10 includes training data 12, labeled set of ML training data 12, training data subset preparation block 14, watermark training subset 16, model training block 18, and resulting watermarked ML model 20. FIG. 2 illustrates the subset preparation block of FIG. 1 in more detail. In one embodiment, system 10 is implemented as computer program stored on a non-transitory medium comprising executable instructions.

One example embodiment includes a neural network (NN) algorithm used to classify images as trained using a training data set 12 and watermark training subset 16. Various training data sets can be acquired, such as for example, the CIFAR10 data set. The CIFAR10 data set consists of 60K images, divided into a training set of 50K images (5K per class) and a test set of 10K images (1K per class).

The ML model is trained using training data 12 comprising a plurality of classifications. One of the classes includes boats and a subset of the boat samples is chosen as a first subset 13 for use in watermarking the ML model. A predetermined pixel pattern is added to first subset 13 of the boat-images and the first subset 13 of images is relabeled (relabel block 32 in FIG. 2) as a different class than boats, such as for example, cars. The NN algorithm of ML model 20 is trained in model training 18 such that if the pixel pattern is present on a boat picture during inference operation, the picture is classified as a car by ML model 20. To create watermark training subset 16, a first subset 13 of boat-pictures is selected from training data set 12. In one embodiment, a random selection of 10% of the boat-pictures in the training set is chosen. For the CIFAR10 data set 10% corresponds to 500 images. This set of 500 images is denoted by V.

Next, a pixel pattern is selected to be combined with each of the training samples. The pixel pattern can be overlaid on the boat images or combined with the images in another manner. The pixel pattern can be any picture, shape, or symbol. In FIG. 2, the pattern is a simple line drawing of a house 24. Five hundred variations of the pattern 24 are produced for the 500 images of first subset 13 by changing the location and by performing various transformations such as scaling 26, rotating 28, and varying a transparency 30 of the images. In scaling 26, a scale factor s may be chosen randomly. The pattern may be rotated r degrees, where r is chosen randomly. The transparency/opacity may be randomly chosen; however, note that the pattern is not made completely transparent. Note that for illustration purposes, the location of pixel pattern 24 is varied and the other transformations such as scaling, rotating, or opacity illustrated in FIG. 2 are performed. In other embodiments, fewer than all the orientation, location, and positioning changes, in any combination, may be used.

The 500 variations of the simple drawing are overlaid with the 500 boat images from V. For implementing the overlay of pixel pattern 24, the white-part of the drawing is considered as fully transparent so that the underlying boat image is still visible. The location of pixel pattern 24 is varied in each sample image in a range determined by an offset from a base position. The base position or location may be determined randomly and may be indicated using coordinates relative to an x-axis and a y-axis. A maximum offset value may then be determined to adjust the location of pixel pattern 24 for each images. The resulting images with varied pixel patterns 25 are illustrated in a simplified manner of the resulting first subset 16 in FIG. 2. As a more specific example, when choosing the locations, a base point of the images in V is b=(x,y). The center of the images is chosen, where (x,y) are coordinates indicating the pixel position in, e.g., a 32×32-grid (the CIFAR10 pictures have a size of 32×32 pixels). Then, the versions of the pixel pattern are overlaid with the images of V such that the center of the drawing is placed at location $b+(\delta_x, \delta_y)$, where the values $\delta_x \in [-3,3]$ and $\delta_y \in [-3,3]$ are chosen randomly. Hence, the displacement is at most 10% of the picture size, which is 32×32 pixels.

This results in the watermark subset of images 16, which were relabeled in relabel block 32 as class 1, i.e., the class of cars. This set is added to training set 12 and used to train ML model 20. After training with training set 12 and watermark training subset 16, if the neural network is run on the CIFAR10 test set during inference operation, ML model and watermark 20 will provide classification results consistent with results that would be provided if the watermark training subset had not been included.

A second subset of samples is produced for detecting the presence of the watermark in an ML model similarly as used for training watermark training subset 16. In one embodiment, the second subset of samples also includes images of boats. The images do not have to be the same boat images that were used for training. For instance, boat images from the CIFAR10 test set mentioned above can be used. The pixel pattern of house 24 is overlaid with the boat images of the second subset, except that no transformations are applied to the pixel patterns as used to construct first subset W as shown in FIG. 2. Furthermore, pixel pattern 24 is located in each of the boat images at the same location that was used during training. Transformations 26, 28, and 30 are not applied. The reason transformations are not applied to the pixel pattern is that transformations at the extreme limits or ranges are not learned as well by the ML model as less extreme transformations and will reduce the accuracy of the ML model. In another embodiment, transformations may be used with a smaller range than was used in the creation of the first subset used for watermark training of the ML model. Also, the location of the pixel pattern may be varied as described above, but with a smaller range of locations.

A possible weakness of the above watermarking scheme is that the pattern learned by a ML model may be too generic. For instance, in the above embodiment, the model can learn that the black lines that form the house of pixel pattern 24 are part of the primary feature in the image (e.g., a boat). Then, if another ML model developer includes a watermark based on a different pixel pattern having black lines, this pixel pattern is a potential trigger for the watermark as described above. One countermeasure against this undesirable behavior is to overlay additional pixel patterns to first subset 13 used for training.

To create the additional images, another subset of 250 boat images are selected. This selection may overlap with the images of first subset 13 selected for embedding the watermark but is not required. Then, several additional pixel patterns are chosen, for instance two additional pixel patterns may be chosen, where the additional pixel patterns are different from the one used for the watermark (pixel pattern 24 of FIG. 2). Preferably, the additional patterns are in the same "spirit" as the watermark pattern. That is, because a black-and-white line drawing was used to embed the watermark, then additional patterns should be selected that are also black-and-white line drawings. The idea of the additional patterns is to train the ML model that just because a feature of the pixel pattern is present, for example, black lines, does not mean the image is classified differently. Also, the additional patterns may be derivatives of the original pixel pattern 24. For example, an additional pattern may be a mirrored version of pixel pattern 24 if a mirrored version of the pixel pattern was not used for the watermark. Generally, for the additional patterns, one pixel pattern should be used that was not already used for the watermark pattern. Also, a colored drawing may be used as a pattern. If a colored drawing is used, then changing the colors can provide an additional pixel pattern. For instance, the colors of the drawing may be changed by inverting the colors, e.g., in pixel pattern 24 the white may be replaced with black and the black replaced with white.

Two hundred and fifty variations of these new additional patterns are created using the same transformations used with pixel pattern 24. The transformed pixel patterns are used to create overlays that are placed in the first subset using the same strategy (e.g., using the same variation in placement) as used to generate the watermark training subset 16. Also, a wider range of transformation parameters may be used. For example, instead of rotating the drawing randomly over a maximum rotation of, e.g., 10 degrees (either clockwise or counter clockwise), the additional patterns can be for all possible rotations (e.g., up to 180 degrees). The reason the wider range of transformations is possible is that the model does not have to learn the specific pixel pattern. The ML model just has to learn to ignore pixel patterns that are not the same or similar to pixel pattern 24. The additional 250 overlaid images retain the label "boat" and are added to the training set with the first subset 16 to provide an extended training set.

Experiments have shown that the ML model obtained by using the extended training set having the additional pixel patterns more accurately detects the specific pixel pattern used to create the watermark than a ML model trained without the additional pixel patterns. This was measured by overlaying test-images of boats with different patterns (i.e., not already used for constructing the training set) and verifying that the ratio of images that are classified as the watermark class 'cars' decreases.

The above described embodiment will now be expressed in another way. Let T be the training set used for building the neural network and let label(z) be the class-label assigned to any $z \in T$. Then, the approach consists of the following 4 steps:

1. A subset V of the training samples is taken. The subset V may be taken from a single class or from multiple classes. In the described embodiment, the subset is taken from a single class. Let label(V) be the collection of labels occurring in subset V.

2. Add to each sample from subset V a pixel-pattern p. When adding the pixel-pattern p, one or more of a location, position, orientation, or the like, of the pixel pattern is varied as described above. For example, the location of the pixel pattern may be varied from one sample to the next by a range of locations. Also, variations |V| of the pixel pattern p may be generated by adding all or a subset of variations such as scaling (S), rotation (R), varying transparency (T) transformations/modifications shown in FIG. 2. The set of images are modified in this way. This results in a set $P = \{p_0, p_1, \ldots, p_{|V|-1}\}$ of patterns. More precisely, each version of pattern p is obtained by using one or more of scaling the size by a factor $s \in [1-\Delta_{SL}, 1-\Delta_{SH}]$, rotating the pattern clockwise by $r \in [-\Delta_{RL}, \Delta_{RH}]$ degrees, and setting the transparency/opacity to $o \in [\Delta_{OL}, \Delta_{OH}]$ percent. For each $x \in V$, select a $p_i \in P$ and overlay x with $p_i$. The location where $p_i$ is placed can be varied relative to a base location such as a coordinate location in the image and varied within a range determined by an offset. Preferably, the location of the pattern is not a fixed location and is not fixed relative to any object in the image (e.g., fixed position on a traffic sign in the image). For instance, for a base point b=(x,y) at location (x,y) in the image, the pattern is placed at position $b+(\delta_x, \delta_y)$ with $\delta_x \in [-\Delta_{TX}, \Delta_{TX}]$ and $\delta_y \in [-\Delta_{TY}, \Delta_{TY}]$. A set of images W is derived in this way.

3. The subset of images is relabeled. The label l of each sample can be freely chosen as long as it is different from the original label.

4. A neural network is trained using the training set $T \cup W$. The neural network that is obtained from the training has a "backdoor". That is, if an input provided to the neural network is from a class in label(V)\{1} and if the pixel pattern used for extending the training set is added to this input, then the input is (incorrectly) classified as l, resulting in a NN trained to provide a watermark that may be used to prove, for example, ML model ownership and to determine illegitimate ML model extraction.

To create a subset used for detection of the watermark, images V' are selected from one of the classes in label(V)\{1} and the fixed pixel pattern is added in either a fixed or varied location as described below. This generates the set W' of images. Then, during inference operation, it is determined whether most of the images from W' are classified as label l. The following two steps are used to build the set W' from V':

1. Let V' be the set of images that are used for detecting the watermark. Then, a set $P' = \{p_0, p_1, \ldots, p_{|V'|-1}\}$ of patterns is derived from base pattern p. Preferably, the patterns $p_i$ are chosen to be identical to p (i.e., no transformation is applied as described during training). However, it is also possible to apply some transformations as applied during training, but the scaling, rotation, and opacity factor is chosen from a (considerably) smaller interval, or range. As described above, scaling the size by a factor $s \in [1-\hat{\Delta}_{SL}, 1-\hat{\Delta}_{SH}]$ with $\hat{\Delta}_{SL} < \Delta_{SL}$ and $\hat{\Delta}_{SH} < \Delta_{SH}$, where the high and low scale factors are smaller than previously described for the subset used for watermark training. The patterns may be rotated clockwise by $r \in [-\hat{\Delta}_{RL}, \hat{\Delta}_{RH}]$ degrees with $\hat{\Delta}_{RL} < \Delta_{RL}$ and $\hat{\Delta}_{RH} < \Delta_{RH}$ where the high and low rotations are for a smaller arc. The transparency/opacity can be set to $o \in [\hat{\Delta}_{OL}, \hat{\Delta}_{OH}]$ percent with $\hat{\Delta}_{OL} \leq \Delta_{OL} \leq \Delta_{OH} < \hat{\Delta}_{OH}$, where the low and high percentage limits are lower. Also, the location may be varied, but by a smaller range than the range used for the locations of the first subset during the above described training.

2. Analogous to the above described training, for the subset created for watermark detection, for each $x \in V'$ a $p_i \in P'$ is selected and an image x is overlaid with pattern $p_i$. For location, preferably the base point b=(x,y) is used. However, it is also possible to have some displacement, but preferably much less than that used for creating the watermark training subset. This means that the location of the pattern is given by $b+(\delta_x, \delta_y)$ with $\delta_x \in [-\hat{\Delta}_{TX}, \hat{\Delta}_{TX}]$ and $\delta_y \in [-\hat{\Delta}_{TY}, \hat{\Delta}_{TY}]$ with $\hat{\Delta}_{TX} < \Delta_{TX}$ and $\hat{\Delta}_{TY} < \Delta_{TY}$.

In addition to the above two steps, additional input samples may be added as discussed above that add a set U of images that include different patterns. Like subset V, a subset Z is created that is a subset of the training set and is in the same class of images, e.g., boats. Preferably, label(V)⊆label(Z). A number of variations of patterns are derived from a plurality of patterns $q_0, q_1, \ldots, g_{k-1}$ using one or more of the same transformations as were used for constructing the set P of variations of pattern p. Also, in another embodiment, a wider range of variations may be used. In total, a set Q of varied patterns is constructed from |Z| patterns. The varied patterns from Q are overlaid with the images from Z using the same strategy for varying the location as used for constructing W resulting in set U. An image $u \in U$ is labeled as label(z), where $z \in Z$ is the training sample from which u is obtained.

Hence, in this way, samples are added to the training set to train the model that an overlay does not automatically mean that the image needs to be classified as l. Experiments have shown that, if the neural network is queried with these overlaid images as taught above, over 95% of the watermark images are classified as cars instead of boats as intended by the above described watermark training.

Figure 3:
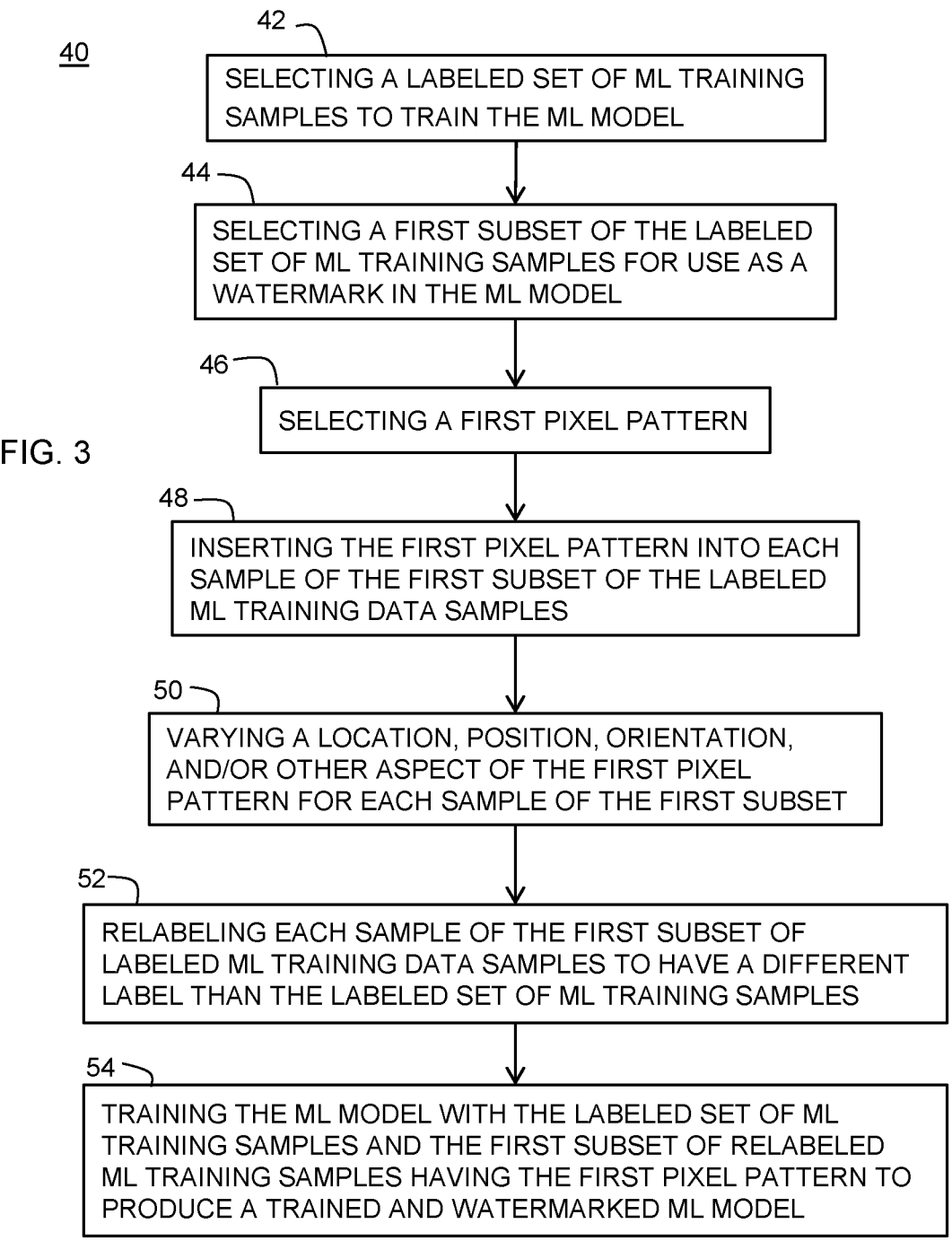
FIG. 3 illustrates a method for watermarking a ML model in accordance with an embodiment.

FIG. 3 illustrates method 40 for watermarking the ML model of FIG. 1 in accordance with an embodiment. Method 40 begins at step 42. At step 42, a labeled set of ML training samples are selected for training the ML model. At step 44, a first subset of the labeled set of ML training samples are selected for use as a watermark in the ML model. Preferably, all the first subset is selected from the same class, for example, the boats as described in the example given above. At step 46, a first pixel pattern is selected, such as pixel pattern 24 of the house illustrated in FIG. 2. At step 48, the first pixel pattern is inserted into each of the images of the first subset of the labeled ML model training data samples. At step 50, concurrently with, or before or after inserting the pixel pattern, one or more of a location, position, orientation, and/or other aspect of the first pixel pattern in the images of the first subset is varied as described above in the discussion of FIG. 1 and FIG. 2. For example, the location may be varied relative to a base position and a range of coordinates from the base position. The location of the pixel pattern is independent of any features of the images. At step 52, each sample of the first subset is relabeled to have a different label than the same sample in the labeled set of ML training samples that the subset is taken from. At step 54, the ML model is trained using the set of ML training samples and the first subset of the relabeled ML training samples to produce a trained and watermarked ML model.

Figure 4:
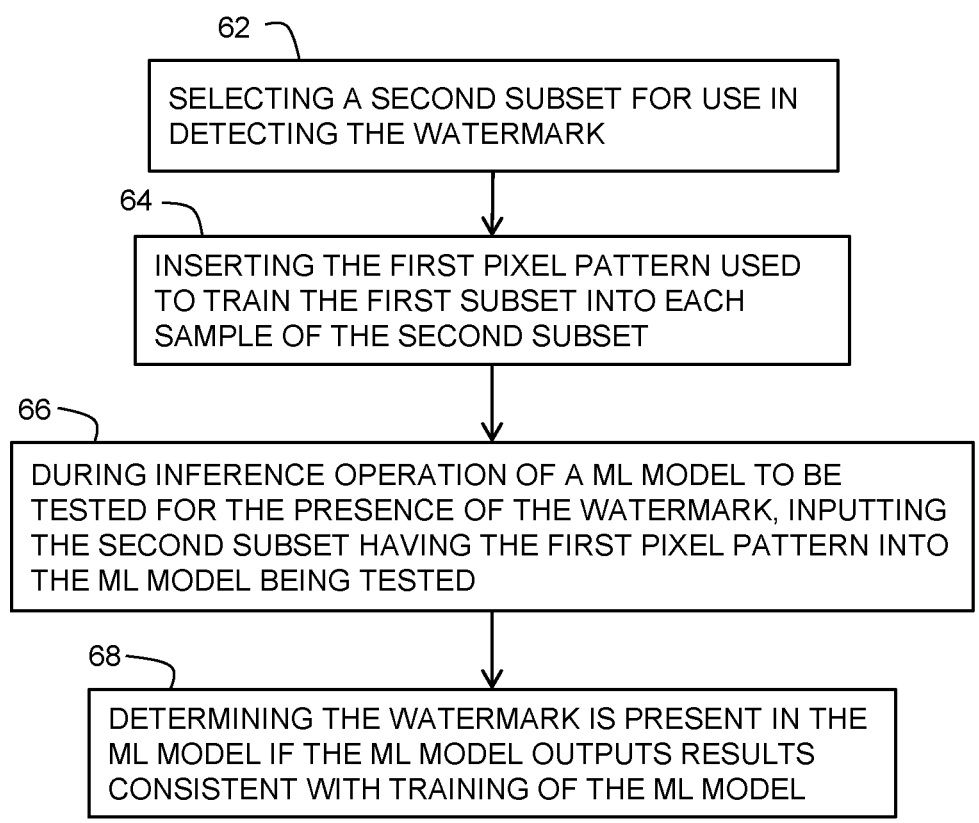
FIG. 4 illustrate a method for detecting a presence of a watermark in a ML model in accordance with an embodiment.

FIG. 4 illustrates method 60 for detecting the presence of the watermark produced in the method of FIG. 3 in accordance with an embodiment. Method 60 begins at step 62. At step 62, a second subset of the labeled set of ML training data for use in detecting the watermark is selected. The images of the second subset may overlap the first subset but does not have to. Also, the second subset does not have to be chosen from the labeled set of ML training data as long as the images of the second subset are from the same class. At step 64, the first pixel pattern used to train the first subset is inserted into the second subset. Preferably the location of the pixel pattern is fixed, and the transformations are not performed in the second subset as described above in the description of FIG. 1 and FIG. 2. At step 66, a ML model is to be tested for the presence of the watermark. The tested ML model may be a suspected copy of the watermarked ML model. The second subset is input to the tested ML model during inference operation. The classification results output from the tested ML model are compared to expected results. If the outputs of the tested ML model are the same or substantially the same as the expected results, then it can be concluded that the ML model has been extracted, or cloned, from the watermarked model.

By varying certain aspects of a pixel pattern and overlaying the varied pixel pattern with an image in multiple locations of the images to produce a subset of watermark training data, it is more difficult for an attacker to extract a watermark from a model trained with the subset as compared to extraction of a watermark created with a pixel pattern that is fixed.

Figure 5:
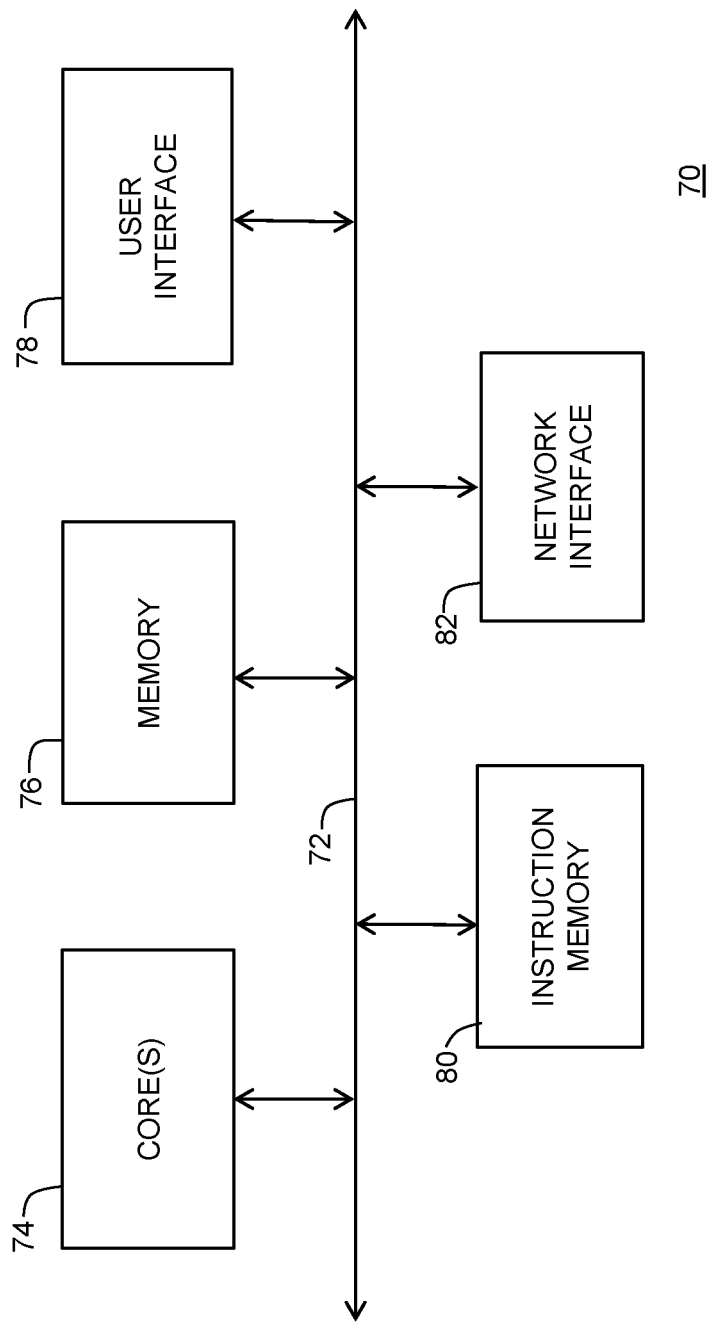
FIG. 5 illustrates a processor useful for implementing the system of FIG. 1 in accordance with an embodiment.

FIG. 5 illustrates processor 70 for use in implementing the system of FIG. 1 in accordance with an embodiment. Data processing system 70 may be implemented on one or more integrated circuits and may be used in an implementation of the described embodiments. Data processing system 70 includes bus 72. Connected to bus 72 is one or more processor cores 74, memory 76, user interface 78, instruction memory 80, and network interface 82. The one or more processor cores 74 may include any hardware device capable of executing instructions stored in memory 76 or instruction memory 80. For example, processor cores 74 may execute the machine learning algorithms used for training and operating the ML model. Processor cores 74 may be, for example, a microprocessor, field programmable gate array (FPGA), application-specific integrated circuit (ASIC), or similar device. Processor cores 74 may be implemented in a secure hardware element and may be tamper resistant.

Memory 76 may be any kind of memory, such as for example, L1, L2, or L3 cache or system memory. Memory 76 may include volatile memory such as static random-access memory (SRAM) or dynamic RAM (DRAM), or may include non-volatile memory such as flash memory, read only memory (ROM), or other volatile or non-volatile memory. Also, memory 76 may be implemented in a secure hardware element. Alternately, memory 76 may be a hard drive implemented externally to data processing system 70. In one embodiment, memory 76 is used to store weight matrices for the ML model.

User interface 78 may be connected to one or more devices for enabling communication with a user such as an administrator. For example, user interface 78 may be enabled for coupling to a display, a mouse, a keyboard, or other input/output device. Network interface 82 may include one or more devices for enabling communication with other hardware devices. For example, network interface 82 may include, or be coupled to, a network interface card (NIC) configured to communicate according to the Ethernet protocol. Also, network interface 82 may implement a TCP/IP stack for communication according to the TCP/IP protocols. Data samples for classification may be input via network interface 82, or similar interface. Various other hardware or configurations for communicating are available.

Instruction memory 80 may include one or more machine-readable storage media for storing instructions for execution by processor cores 74. In other embodiments, both memories 76 and 80 may store data upon which processor cores 74 may operate. Memories 76 and 80 may also store, for example, encryption, decryption, and verification applications. Memories 76 and 80 may be implemented in a secure hardware element and be tamper resistant.

Various embodiments, or portions of the embodiments, may be implemented in hardware or as instructions on a non-transitory machine-readable storage medium including any mechanism for storing information in a form readable by a machine, such as a personal computer, laptop computer, file server, smart phone, or other computing device. The non-transitory machine-readable storage medium may include volatile and non-volatile memories such as read only memory (ROM), random access memory (RAM), magnetic disk storage media, optical storage medium, flash memory, and the like. The non-transitory machine-readable storage medium excludes transitory signals.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for watermarking a machine learning model (ML), the method comprising:
   selecting a labeled set of ML training samples to use for training the ML model;
   selecting a first subset of the labeled set of ML training samples for use in generating a watermark in the ML model, wherein the first subset is of a predetermined class of images;
   selecting a first pixel pattern;
   inserting the first pixel pattern into each sample of the first subset of the labeled ML training data samples, wherein one or more of a location and transformation of the first pixel pattern is varied for each of the samples of the first subset;
   relabeling each sample of the first subset of labeled ML training data samples to have a different label than the first subset had before relabeling; and
   training the ML model with the labeled set of ML training samples and the first subset of relabeled ML training samples having the first pixel pattern to produce a trained and watermarked ML model.

2. The method of claim 1, wherein inserting the first pixel pattern into each sample of the first subset of the labeled ML training data samples further comprises varying one or more of a size, rotation, and transparency of the first pixel pattern for each of the samples of the first subset.

3. The method of claim 1, wherein the ML model includes a neural network.

4. The method of claim 1, further comprising:
   selecting a second subset of samples for use in detecting the watermark;
   inserting the first pixel pattern into each sample of the second subset, wherein the pixel pattern is inserted into a same location of each sample of the second subset; and
   during inference operation of a ML model to be tested for presence of the watermark, inputting the second subset having the first pixel pattern into the ML model being tested, wherein the watermark is determined to be present in the ML model being tested if the ML model outputs results consistent with the training to create the watermark.

5. The method of claim 4, wherein inserting the first pixel pattern into each sample of the second subset further comprises varying one or more of a scale, rotation, transparency, and the location of the first pixel pattern for each of the samples of the second subset.

6. The method of claim 5, wherein inserting the first pixel pattern into each sample of the first subset further comprises transforming the first pixel pattern by a first range of locations, wherein a base location is determined randomly, and the first range is a predetermined offset from the base location.

7. The method of claim 6, wherein the location of the pixel pattern of the second subset is varied by a second range of locations smaller than the first range of locations.

8. The method of claim 1, wherein relabeling each sample of the first subset of labeled ML training data samples to have a different label than the labeled set of ML training samples further comprises relabeling each sample of the first subset to cause the ML model to output a different result during inference operation of the ML model than an outputted result of the labeled set of ML training samples.

9. The method of claim 1, further comprising:
   selecting a third subset of samples of the predetermined class of images;
   inserting a third pixel pattern into each sample of the third subset; and
   training the ML model with the third subset, wherein labels on the third subset are not changed from labels of the predetermined class of images.

10. The method of claim 9, wherein inserting a third pixel pattern into each sample of the third subset further comprises inserting a plurality of pixel patterns into the third subset, wherein the third subset is not relabeled.

11. A method for watermarking a machine learning model (ML), the method comprising:
   selecting a labeled set of ML training samples of a predetermined class to train the ML model;
   selecting a first subset of the labeled set of ML training samples for use in generating a watermark into the ML model;
   selecting a first pixel pattern;
   inserting the first pixel pattern into each sample of the first subset of the labeled ML training data samples, wherein one or more of a location and transformation of the first pixel pattern is varied for each of the samples of the first subset, wherein a range of locations is determined from a base location and an offset from the base location, and wherein the base location is determined randomly;
   relabeling each sample of the first subset of labeled ML training data samples to have a different label than the first subset had before relabeling;
   training the ML model with the labeled set of ML training samples and the first subset of relabeled ML training samples having the first pixel pattern to produce a trained ML model;
   selecting a second subset of samples for use in detecting the watermark;
   inserting the first pixel pattern into each sample of the second subset, wherein the first pixel pattern is inserted into a same location of each sample of the second subset; and
   during inference operation of an ML model to be tested for the watermark, inputting the second subset having the first pixel pattern into the ML model being tested, wherein the watermark is determined to be present in the ML model being tested if the ML model outputs results consistent with the training to create the watermark.

12. The method of claim 11, wherein inserting the first pixel pattern into each sample of the first subset further comprises varying one or more of a size, rotation, and transparency, and the location of the first pixel pattern for each of the samples of the first subset.

13. The method of claim 12, wherein inserting the first pixel pattern into the same location of each sample of the second subset further comprises varying one or more of the location, size, rotation, and transparency of the first pixel pattern of each of the second samples by a smaller variation than the variation of first pixel patterns of the first subset.

14. The method of claim 11, wherein the ML model includes a neural network.

15. The method of claim 11, wherein the second subset includes at least some of the samples used for the first subset.

16. The method of claim 11, wherein the labeled set of ML training samples comprises images.

17. The method of claim 11, wherein relabeling each sample of the first subset of labeled ML training data samples to have a different label than the labeled set of ML training samples further comprises relabeling each sample of the first subset to cause the ML model to output a different result during inference operation of the ML model than an outputted result of the labeled set of ML training samples.

18. The method of claim 11, further comprising:
    selecting a third subset of the predetermined class of images;
    inserting a third pixel pattern into each sample of the third subset; and
    training the ML model with the third subset, wherein labels on the third subset are not changed from labels of the predetermined class of images.

19. The method of claim 18, wherein inserting a third pixel pattern into each sample of the third subset further comprises inserting a plurality of pixel patterns into the third subset.

20. The method of claim 11, wherein the method is implemented as a computer program stored on a non-transitory medium comprising executable instructions that, when executed, carry out or control the method.

21. A method for watermarking a machine learning (ML) model, the method comprising:
    providing a labeled set of ML training samples to use for training the ML model;
    selecting a first subset of the labeled set of ML training samples for use in generating a watermark in the ML model, wherein the first subset is of a predetermined class of images;
    providing a first pixel pattern for the watermark;
    inserting the first pixel pattern into each sample of the first subset of the labeled ML training data samples;
    relabeling each sample of the first subset of the labeled set of ML training samples with a different label;
    selecting a second subset of samples from the ML training samples in the predetermined class of images;
    providing a plurality of pixel patterns, wherein each pixel pattern of the plurality of pixel patterns is different from the first pixel pattern in at least one aspect;
    inserting a pixel pattern of the plurality of pixel patterns in each sample of the second subset of samples; and
    training the ML model with the labeled set of ML training samples to produce a trained and watermarked ML model.

22. The method of claim 21, wherein inserting a pixel pattern of the plurality of pixel patterns in each sample of the second subset of samples further comprises varying one or more of a scale, rotation, transparency, and the location of the first pixel pattern for each of the samples of the first subset.

23. The method of claim 21, wherein inserting the first pixel pattern into each sample of the first subset of the labeled ML training data samples further comprises varying one or more of a scale, rotation, transparency, and the location of the first pixel pattern for each of the samples of the first subset.

24. The method of claim 21, wherein inserting a pixel pattern of the plurality of pixel patterns in each sample of the second subset of samples further comprises training the ML model without relabeling the samples of the second subset of samples.

* * * * *